(12) United States Patent
Feldermann et al.

(10) Patent No.: US 8,901,216 B2
(45) Date of Patent: Dec. 2, 2014

(54) IMPACT-MODIFIED POLYESTER/POLYCARBONATE COMPOSITIONS WITH IMPROVED ELONGATION AT BREAK

(75) Inventors: Achim Feldermann, Dusseldorf (DE); Eckhard Wenz, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 483 days.

(21) Appl. No.: 13/215,083

(22) Filed: Aug. 22, 2011

(65) Prior Publication Data
US 2012/0053271 A1    Mar. 1, 2012

(30) Foreign Application Priority Data
Aug. 24, 2010    (DE) .................... 10 2010 039 712

(51) Int. Cl.
  *C08L 51/04*    (2006.01)
  *C08L 67/02*    (2006.01)
  *C08K 3/32*     (2006.01)

(52) U.S. Cl.
  USPC ............ 524/125; 524/145; 524/414; 524/504

(58) Field of Classification Search
  USPC .................................. 524/125, 504, 414, 145
  See application file for complete search history.

(56) References Cited

U.S. PATENT DOCUMENTS

| | | | | |
|---|---|---|---|---|
| 4,764,556 | A * | 8/1988 | Lausberg et al. | ............... 525/67 |
| 5,994,463 | A * | 11/1999 | Eckel et al. | ............... 525/67 |
| 2002/0147256 | A1 | 10/2002 | Eckel et al. | |

FOREIGN PATENT DOCUMENTS

| | | |
|---|---|---|
| EP | 0 247 465 | 12/1987 |
| EP | 0594021 | 4/1994 |
| EP | 0 594 021 | 4/1997 |
| JP | 5032800 | 2/1993 |
| JP | 6228425 | 8/1994 |
| JP | 8 012864 | 1/1996 |
| JP | 8012864 | 1/1996 |
| WO | 98/17725 | 4/1998 |
| WO | WO 98/17725 | * 4/1998 .............. C08L 69/00 |
| WO | 02/08329 | 1/2002 |
| WO | 2007/087346 | 8/2007 |

OTHER PUBLICATIONS

English language translation of "International Search Report and Written Opinion of PCT/EP20111064367 dated Oct. 20, 2011," submitted originally in the German language in an IDS filed Feb. 23, 2012, entire document.
Kim T "Database WPI", Thomson Scientific, London, GB, Cheil Ind Inc. (2009), p. 1-2. XP-002661039.
International Search Report and Written Opinion of PCT/EP2011/064367 Dated Oct. 20, 2011.

* cited by examiner

*Primary Examiner* — Robert D. Harlan
(74) *Attorney, Agent, or Firm* — Miles & Stockbridge P.C.

(57) ABSTRACT

The present invention relates to impact-modified polyester/polycarbonate compositions containing: A) 41 to 80 parts by weight, in each case relative to the sum of the parts by weight of components A+B+C+D, of aromatic polycarbonate, B) 5 to 40 parts by weight, in each case relative to the sum of the parts by weight of components A+B+C+D, of polyester with a content of isophthalic acid building blocks, C) 1 to 15 parts by weight, in each case relative to the sum of the parts by weight of components A+B+C+D, of rubber-modified graft polymer, D) 0 to 25 parts by weight, in each case relative to the sum of the parts by weight of components A+B+C+D, of a flame retardant, E) 0 to 20 parts by weight, in each case relative to the sum of the parts by weight of components A+B+C+D=100, of vinyl (co)polymer, F) 0 to 50 parts by weight, in each case relative to the sum of the parts by weight of components A+B+C+D=100, of additives, wherein all the stated parts by weights in the present application are normalized such that the sum of the parts by weight of components A+B+C+D in the composition amounts to 100, which exhibit improved elongation at break in conjunction with excellent multiaxial toughness and low molding shrinkage. Provided that these compositions have been rendered flame-retardant, they exhibit flame retardant properties which are equal to or better than known compositions.

20 Claims, No Drawings

IMPACT-MODIFIED POLYESTER/POLYCARBONATE COMPOSITIONS WITH IMPROVED ELONGATION AT BREAK

CROSS REFERENCE TO RELATED APPLICATIONS

This application claims priority to German Patent Application 10 2010 039712.1 filed Aug. 24, 2010, the entire content of which is hereby incorporated by reference in its entirety.

BACKGROUND

1. Field of the Invention

The present invention relates generally to impact-modified polyester/polycarbonate compositions which exhibit improved elongation at break in conjunction with excellent multiaxial toughness and low moulding shrinkage.

Provided that these compositions have been rendered flame-retardant, they exhibit flame retardant properties which are equal to or better than known compositions.

2. Description of Related Art

JP 06228425 describes blends of polycarbonate with two different polyesters, wherein both polyesters may contain other dicarboxylic acids in addition to terephthalic acid. The combination of ethylene glycol as alcohol component with small quantities of isophthalic acid in the acid component is, however, not described.

JP 08012864 describes impact-modified blends of polycarbonate and polyesters with oligophosphates as flame retardant. The polyesters may inter alia contain isophthalic acid, but exact proportions of the phthalic acid monomers in the compositions are not disclosed.

JP 05032800 discloses compositions prepared from 50-90% of a copolyester with 50-10% polycarbonate together with the films produced therefrom for foodstuffs packaging. The copolyester may contain various dicarboxylic acids and or diols, while impact modifier-containing compositions are not described.

EP 594021 describes impact-modified blends of polycarbonate and polyalkylene terephthalate with oligophosphates as flame retardant. The moulding compounds are distinguished by good stress cracking resistance, notch impact resistance and heat resistance combined with a good surface finish.

WO 2002008329 discloses flame resistant polycarbonate compositions with oligophosphate, which have a low IPP (isopropenylphenyl phosphate) content and, in addition to vinyl copolymers, may also contain polyalkylene terephthalates. The compositions exhibit improved mechanical properties, improved flame retardancy, improved heat resistance together with improved long-term stability.

SUMMARY

An object of the present invention was to provide impact-modified polyester/polycarbonate compositions having an ideal combination of elevated elongation at break, elevated multiaxial toughness and low moulding shrinkage, optionally together with good flame retardant behaviour. In particular, an intention of the present disclosure was to provide compositions which still exhibit good flame retardant properties even at an elevated content of polyester (i.e. greater than or equal to 20 parts by weight).

It has now surprisingly been found that moulding compounds or compositions comprising A) polycarbonate, B) polyester with a content of isophthalic acid building blocks, C) rubber-modified graft polymer and D) optionally a flame retardant and furthermore optionally vinyl (co)polymer (E) and further additives (F) can exhibit a desired profile of properties.

In particular a suitable composition comprises

A) 41 to 80 parts by weight, preferably 43 to 75 parts by weight, particularly preferably 45 to 73 parts by weight (in each case relative to the sum of the parts by weight of components A+B+C+D) of aromatic polycarbonate, B) 5 to 40 parts by weight, preferably 10 to 35 parts by weight, particularly preferably 15 to 30 parts by weight, still more preferably 21 to 30 parts by weight (in each case relative to the sum of the parts by weight of components A+B+C+D) of polyester with a content of isophthalic acid building blocks, C) 1 to 15 parts by weight, preferably 2 to 11 parts by weight, particularly preferably 4 to 9 parts by weight (in each case relative to the sum of the parts by weight of components A+B+C+D) of rubber-modified graft polymer, D) 0 to 25 parts by weight, preferably 5 to 18 parts by weight, particularly preferably 7 to 14 parts by weight (in each case relative to the sum of the parts by weight of components A+B+C+D) of a flame retardant, E) 0 to 20 parts by weight, preferably 0 to 15 parts by weight, more preferably 0.1 to 10 parts by weight (relative to the sum of the parts by weight of components A+B+C+D=100) of vinyl (co)polymer, F) 0 to 50 parts by weight, preferably 0.5 to 25 parts by weight, more preferably 1.0 to 4.0 parts by weight (in each case relative to the sum of the parts by weight of components A+B+C+D=100) of additives, wherein all the stated parts by weights in the present application are normalised such that the sum of the parts by weight of components A+B+C+D in the composition amounts to 100. A composition of the present invention is capable of solving the above-stated technical problem.

DETAILED DESCRIPTION OF A PREFERRED EMBODIMENT

Even at a content of component B) of up to 40 parts by weight (relative to components A-D), excellent flame retardant properties of the composition are still achieved in many embodiments.

Component A

Component A aromatic polycarbonates and/or aromatic polyester carbonates which are suitable according to the invention are known from the literature or may be produced using methods known from the literature (for the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 007 934).

The production of aromatic polycarbonates proceeds for example by reacting diphenols with carbonic acid halides, preferably phosgene, and/or with aromatic dicarboxylic acid dihalides, preferably benzenedicarboxylic acid dihalides, by the phase boundary method, optionally using chain terminators, for example monophenols, and optionally using trifunctional or more than trifunctional branching agents, for example triphenols or tetraphenols. Production by means of a melt polymerisation method by reacting diphenols with for example diphenyl carbonate is likewise possible.

Diphenols for producing aromatic polycarbonates and/or aromatic polyester carbonates are preferably those of formula (I)

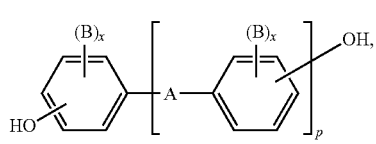

wherein
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic rings optionally containing heteroatoms may be fused,
or a residue of formula (II) or (III)

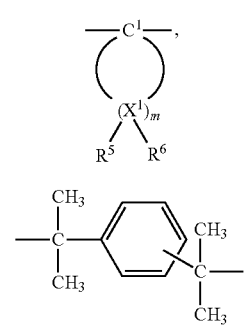

B is in each case $C_1$ to $C_{12}$ alkyl, preferably methyl, halogen, preferably chlorine and/or bromine
x is in each case mutually independently 0, 1 or 2,
p is 1 or 0, and
$R^5$ and $R^6$, individually selectably for each $X^1$, mutually independently mean hydrogen or $C_1$ to $C_6$ alkyl, preferably hydrogen, methyl or ethyl,
$X^1$ means carbon and
m means an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis(hydroxyphenyl) ethers, bis(hydroxyphenyl) sulfoxides, bis(hydroxyphenyl) ketones, bis(hydroxyphenyl) sulfones, and α,α-bis-(hydroxyphenyl)-diisopropylbenzenes together with the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof such as for example 2,2-bis(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-Bis-(4-hydroxyphenyl)propane (bisphenol A) is especially preferred.

The diphenols may be used individually or as any desired mixtures. The diphenols are known from the literature or may be obtained using methods known from the literature.

Chain terminators suitable for the production of thermoplastic, aromatic polycarbonates are for example phenol, p-chlorophenol, p-tert.-butylphenol or 2,4,6-tribromophenol, as well as long-chain alkylphenols, such as 4-[2-(2,4,4-trimethylpentyl)]-phenol, 4-(1,3-tetramethylbutyl)-phenol according to DE-A 2 842 005 or monoalkylphenol or dialkylphenols with a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)-phenol and 4-(3,5-dimethylheptyl)-phenol. The quantity of chain terminators to be used amounts in general to between 0.5 mol %, and 10 mol %, relative to the total number of moles of the diphenols used in each case.

The thermoplastic, aromatic polycarbonates have average weight-average molecular weights ($M_w$, measured by GPC (gel permeation chromatography with a polycarbonate standard) of 10,000 to 200,000 g/mol, preferably 15,000 to 80,000 g/mol, particularly preferably 24,000 to 36,000 g/mol.

The thermoplastic, aromatic polycarbonates may be branched in known manner, preferably by incorporating 0.05 to 2.0 mol %, relative to the total of the diphenols used, of trifunctional or more than trifunctional compounds, for example those with three or more phenolic groups. Linear polycarbonates are preferably used, more preferably those based on bisphenol A.

Both homopolycarbonates and copolycarbonates are suitable. Component A copolycarbonates according to the invention may also be produced using 1 to 25 wt. %, preferably 2.5 to 25 wt. % (relative to the total quantity of diphenols to be used) of polydiorganosiloxanes with hydroxyaryloxy terminal groups. The latter are known (U.S. Pat. No. 3,419,634) and may be produced using methods known from the literature. Copolycarbonates containing polydiorganosiloxane are likewise suitable; the production of copolycarbonates containing polydiorganosiloxane is described, for example, in DE-A 3 334 782.

In addition to bisphenol A homopolycarbonates, preferred polycarbonates are the copolycarbonates of bisphenol A with up to 15 mol %, relative to the total number of moles of diphenols, of diphenols other than those stated to be preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and naphthalene 2,6-dicarboxylic acid.

Particularly preferred are mixtures of the diacid dichlorides of isophthalic acid and terephthalic acid in a ratio of between 1:20 and 20:1.

When producing polyester carbonates, a carbonic acid halide, preferably phosgene, is preferably additionally used as a difunctional acid derivative.

In addition to the monophenols already mentioned, suitable chain terminators for the production of aromatic polyester carbonates are the chloroformic acid esters of said monophenols as well as the acid chlorides of aromatic monocarboxylic acids, which may optionally be substituted by $C_1$ to $C_{22}$ alkyl groups or by halogen atoms, and aliphatic $C_2$ to $C_{22}$ monocarboxylic acid chlorides.

The quantity of chain terminators amounts in each case to 0.1 to 10 mol %, relative, in the case of phenolic chain terminators, to the moles of diphenols and, in the case of monocarboxylic acid chloride chain terminators, to the moles of dicarboxylic acid dichloride.

One or more aromatic hydroxycarboxylic acids may additionally be used in the production of aromatic polyester carbonates.

The aromatic polyester carbonates may be both linear and branched in known manner (see in this respect DE-A 2 940 024 and DE-A 3 007 934), wherein linear polyester carbonates are preferred.

The branching agents used may be for example tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in quantities of 0.01 to 1.0 mol % (relative to the dicarboxylic acid dichlorides used) or tri- or polyfunctional phenols, such as phloroglucinol, 4,6-dimethyl-2,4,6-tri-(4-hydroxyphenyl)-hept-2-ene, 4,6-dimethyl-2,4-6-tri-(4-hydroxyphenyl)heptane, 1,3,5-tri(4-hydroxyphenyl)benzene, 1,1,1-tri(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenylisopropyl)-phenol, tetra-(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl)methyl]benzene, in quantities of 0.01 to 1.0 mol % relative to the diphenols used. Phenolic branching agents may be initially introduced with the diphenols; acid chloride branching agents may be introduced together with the acid dichlorides.

The proportion of carbonate structural units in the thermoplastic, aromatic polyester carbonates may vary as desired. The proportion of carbonate groups preferably amounts to up to 100 mol %, in particular up to 80 mol %, particularly preferably up to 50 mol %, relative to the total number of ester groups and carbonate groups. Both the ester and the carbonate moieties of the aromatic polyester carbonates may be present in the polycondensate in the form of blocks or randomly distributed.

The thermoplastic, aromatic polycarbonates and polyester carbonates may be used alone or in any desired mixture.

Component B

According to the invention, the compositions contain a polyester as component B), wherein a proportion of the monomers is advantageously isophthalic acid. The polyesters are preferably selected from the group of polyalkylene dicarboxylic acid esters or mixtures of these polyesters. A mixture of isophthalic acid and terephthalic acid is further preferred as the dicarboxylic acid monomer, wherein aliphatic, cycloaliphatic or araliphatic diols are preferred as the diol component.

Polyalkylene terephthalates for the purposes of the invention are thus preferably polyalkylene terephthalates which are derived from terephthalic acid (or the reactive derivatives thereof) and alkanediols for example based on ethylene glycol, propylene glycol or butanediol.

In a preferred embodiment, the alkanediol is selected from the group which comprises ethylene glycol and butanediol, wherein ethylene glycol is particularly preferred.

The component B) polyesters preferably contain at least 0.5 wt. %, preferably at least 1.0 wt. %, and particularly preferably at least 2.0 wt. % of isophthalic acid building blocks, and at most 10.0 wt. %, preferably at most 5.0 wt. %, and particularly preferably at most 4.0 wt. % of isophthalic acid building blocks, in each case relative to component B, wherein the upper and lower limits may in each case be combined with one another. The other dicarboxylic acid monomers are then terephthalic acid.

Hereinafter, polyesters and in particular polyalkylene terephthalates are those according to the present invention having a content of isophthalic acid building blocks as defined above, unless explicitly described otherwise.

According to the invention, polyethylene terephthalate, polybutylene terephthalate and/or polytrimethylene terephthalate are preferably used as component B), with polyethylene terephthalate having a corresponding proportion of isophthalic acid building blocks most preferably being used.

Preferred polyalkylene terephthalates may be produced from terephthalic acid and isophthalic acid (or the reactive derivatives thereof) and aliphatic or cycloaliphatic diols with 2 to 10 C atoms in accordance with known methods (Kunststoff-Handbuch, vol. VIII, p. 695 et seq., Karl-Hanser-Verlag, Munich 1973).

In addition to ethylene or 1,3-propanediol or 1,4-butanediol glycol residues, preferred polyalkylene terephthalates may contain up to 20 mol. % of other aliphatic diols with 3 to 12 C atoms or cycloaliphatic diols with 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3-pentanediol and 1,6,2-ethyl-1,3-hexanediol, 2,2-diethyl-1,3-propanediol, 2,5-hexanediol, 1,4-di-(β-hydroxyethyl)benzene, 2,2-bis(4-hydroxycyclohexyl)propane, 2,4-dihydroxy-1,1,3,3-tetramethylcyclobutane, 2,2-bis-(3-β-hydroxyethoxyphenyl)propane and 2,2-bis-(4-hydroxypropoxyphenyl)propane (DE-A 24 07 674, 24 07 776, 27 15 932). Ethylene glycol is particularly preferred.

The polyalkylene terephthalates may be branched by the incorporation of relatively small quantities of tri- or tetrahydric alcohols or tribasic or tetrabasic carboxylic acids, for example according to DE-A 19 00 270 and U.S. Pat. No. 3,692,744. Examples of preferred branching agents are trimesic acid, trimellitic acid, trimethylolethane, trimethylolpropane and pentaerythritol.

It may be advisable in some cases to use no more than 1 mol. % of the branching agent, relative to the acid component.

The polyalkylene terephthalates generally have an intrinsic viscosity of approx. 0.4 to 1.5 dl/g, preferably of 0.5 to 1.3 dl/g, particularly preferably of 0.6-1.1 dl/g, in each case measured in phenol/o-dichlorobenzene (1:1 parts by weight) at 25° C.

In an alternative embodiment, the polyesters produced according to the invention may also be used as a mixture with other polyesters and/or further polymers. Mixtures of polyalkylene terephthalates with other polyesters are particularly preferably used.

In a further preferred embodiment, at least a proportion of component B) is a recycled polyester having a proportion according to the invention of isophthalic acid building blocks, wherein component B) preferably consists entirely of recycled material. Recycled materials may furthermore also be used for components A) and C), wherein these may also originate from a blend, optionally a flame-retardant blend (component D)).

Recycled materials for the purposes of the present invention include polyesters, which are for example used for producing bottles and, after use, are sent for recycling as a raw material. The bottles are here collected, cleaned and comminuted. Further optional reprocessing steps are drying and extrusion into granules. The polyesters are preferably additionally subjected to a condensation reaction to increase their molecular weight.

Component C

Component C comprises one or more graft polymers of

C.1 5 to 95, preferably 30 to 90 wt. %, of at least one vinyl monomer onto

C.2 95 to 5, preferably 70 to 10 wt. % of at least one grafting backbone selected from the group consisting of diene rubber, EP(D)M rubbers (i.e. those based on ethylene/propylene and optionally diene), acrylate, polyurethane, silicone, silicone-acrylate, chloroprene and ethylene-vinyl acetate rubbers.

The grafting backbone C.2 generally has an average particle size ($d_{50}$ value) of 0.05 to 10 µm, preferably of 0.1 to 5 µm, particularly preferably of 0.2 to 0.4 µm. Monomers C.1 are preferably mixtures of C.1.1 50 to 99 parts by weight of vinyl aromatics and/or ring-substituted vinyl aromatics (such as styrene, α-methylstyrene, p-methylstyrene, p-chlorostyrene) and/or (meth)acrylic acid ($C_1$-$C_8$) alkyl esters, such as methyl methacrylate, ethyl methacrylate), and C.1.2 1 to 50 parts by weight of vinyl cyanides (unsaturated nitriles such as acrylonitrile and methacrylonitrile) and/or (meth)acrylic acid ($C_1$-$C_8$) alkyl esters, such as methyl methacrylate, n-butyl acrylate, tert.-butyl acrylate, and/or derivatives (such as anhydrides and imides) of unsaturated carboxylic acids, for example maleic anhydride and N-phenylmaleimide.

Preferred monomers C.1.1 are selected from among at least one of the monomers styrene, α-methylstyrene and methyl methacrylate, preferred monomers C.1.2 are selected from among at least one of the monomers acrylonitrile, maleic anhydride and methyl methacrylate. Particularly preferred monomers are C.1.1 styrene and C.1.2 acrylonitrile.

Preferred grafting backbones C.2 are silicone-acrylate rubbers, diene rubbers (for example based on butadiene and isoprene) or mixtures of diene rubbers. For the purposes of the invention, diene rubbers should also be taken to mean copolymers of diene rubbers or mixtures thereof with further copolymerisable monomers (e.g. according to C.1.1 and C.1.2).

The grafting backbones C.2 generally exhibit a glass transition temperature of <10° C., preferably of <0° C., particularly preferably of <-10° C.

Particularly preferred polymers C are for example ABS polymers (emulsion, bulk and suspension ABS), as described for example in DE-OS 2 035 390 (=U.S. Pat. No. 3,644,574) or in DE-OS 2 248 242 (=GB patent 1 409 275) or in Ullmanns Enzyklopädie der Technischen Chemie, vol. 19 (1980), p. 280 et seq.

The gel content of the grafting backbone C.2 preferably amounts to at least 20 wt. %, in the case of grafting backbones C.2 produced by emulsion polymerisation preferably at least 40 wt. % (measured in toluene).

The graft polymer prepared from components C.1 and C.2 preferably has a core-shell structure, wherein component C.1 forms the shell and component C.2 the core (see for example Ullmann's Encyclopedia of Industrial Chemistry, VCH-Verlag, Vol. A21, 1992, page 635 and page 656).

The graft copolymers C can suitably be produced by free-radical polymerisation, for example by emulsion, suspension, solution or bulk polymerisation, preferably by emulsion or bulk polymerisation.

Further particularly suitable graft rubbers are ABS polymers produced by an emulsion polymerisation method with redox initiation using an initiator system of an organic hydroperoxide and ascorbic acid according to U.S. Pat. No. 4,937,285.

Since it is known that, in the grafting reaction, the grafting monomers are not necessarily all grafted onto the grafting backbone, graft polymers C are understood according to the invention also to mean those products which are obtained by (co)polymerisation of the grafting monomers in the presence of the grafting backbone and also arise during working up.

Suitable acrylate rubbers according to C.2 of the polymers C are preferably polymers of acrylic acid alkyl esters, optionally with up to 40 wt. %, relative to C.2, of other polymerisable, ethylenically unsaturated monomers. The preferred polymerisable acrylic acid esters include $C_1$ to $C_8$ alkyl esters, for example methyl, ethyl, butyl, n-octyl and 2-ethylhexyl esters; haloalkyl esters, preferably halo-$C_1$-$C_8$-alkyl esters, such as chloroethyl acrylate and mixtures of these monomers.

For crosslinking, monomers with more than one polymerisable double bond may be copolymerised. Preferred examples of crosslinking monomers are esters of unsaturated monocarboxylic acids with 3 to 8 C atoms and unsaturated monovalent alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; and also triallyl phosphate and diallyl phthalate. Preferred crosslinking monomers are allyl methacrylate, ethylene glycol dimethacrylate, diallyl phthalate and heterocyclic compounds comprising at least three ethylenically unsaturated groups. Particularly preferred crosslinking monomers are the cyclic monomers triallyl cyanurate, triallyl isocyanurate, triacryloylhexahydro-s-triazine, triallyl benzenes. The quantity of crosslinked monomers amounts preferably to 0.02 to 5, in particular 0.05 to 2 wt. %, relative to the grafting backbone C.2. In the case of cyclic crosslinking monomers with at least three ethylenically unsaturated groups it is advantageous to limit the quantity to below 1 wt. % of the grafting backbone C.2.

Preferred "other" polymerisable, ethylenically unsaturated monomers, which may, in addition to the acrylic acid esters, optionally serve to produce the grafting backbone C.2, are for example acrylonitrile, styrene, α-methylstyrene, acrylamides, vinyl $C_1$-$C_6$ alkyl ethers, methyl methacrylate, butadiene. Acrylate rubbers preferred as grafting backbone C.2 are emulsion polymers which exhibit a gel content of at least 60 wt. %.

Suitable silicone rubbers according to C.2 may be produced by emulsion polymerisation, as for example described in U.S. Pat. No. 2,891,920 and U.S. Pat. No. 3,294,725. Further suitable grafting backbones according to C.2 are silicone rubbers with active grafting sites, such as are described in DE-OS 3 704 657, DE-OS 3 704 655, DE-OS 3 631 540 and DE-OS 3 631 539.

According to the invention, silicone-acrylate rubbers are also suitable as grafting backbones C.2. These silicone-acrylate rubbers are composite rubbers with active grafting sites containing a proportion of silicone rubber of 10-90 wt. % and a proportion of polyalkyl (meth)acrylate rubber of 90 to 10 wt. %, wherein the two stated rubber components interpenetrate in the composite rubber, such that they substantially cannot be separated from one another. If the proportion of the silicone rubber component in the composite rubber is too high, the finished resin compositions have disadvantageous surface characteristics and impaired colourability. If, on the other hand, the proportion of the polyalkyl (meth)acrylate rubber component in the composite rubber is too high, the impact strength of the finished resin composition is impaired. Silicone-acrylate rubbers are known and described, for example, in U.S. Pat. No. 5,807,914, EP 430134 and U.S. Pat.

No. 4,888,388. A graft polymer produced by emulsion polymerisation with C.1 methyl methacrylate and C.2 silicone-acrylate composite rubber is preferably used.

The gel content of the grafting backbone C.2 is determined at 25° C. in a suitable solvent (M. Hoffmann, H. Krömer, R. Kühn, Polymeranalytik I & II, Georg Thieme-Verlag, Stuttgart 1977).

The average particle size $d_{50}$ is the diameter above and below which are located in each case 50 wt. % of the particles. It may be determined by means of ultracentrifuge measurement (W. Scholtan, H. Lange, Kolloid, Z. and Z. Polymere 250 (1972), 782-796).

The glass transition temperature is determined by means of dynamic differential thermal analysis (DSC) according to standard DIN EN 61006 at a heating rate of 10 K/min with $T_g$ being defined as the midpoint temperature (tangent method).

Component D

The compositions according to the invention may furthermore contain flame retardants, wherein these are preferably selected from the group which comprises phosphorus-containing flame retardants and halogenated flame retardants.

Phosphorus-containing flame retardants are particularly preferred, wherein these phosphorus-containing flame retardants are selected from among the groups of mono- and oligomeric phosphorus and phosphonic acid esters, phosphonate amines, phosphazenes and phosphinic acid salts, wherein mixtures of several components selected from among one or more of these groups may also be used as flame retardants. Other halogen-free phosphorus compounds not specifically mentioned here may be used alone or in any desired combination with other halogen-free phosphorus compounds.

Preferred mono- and oligomeric phosphoric or phosphonic acid esters are phosphorus compounds of the general formula (V)

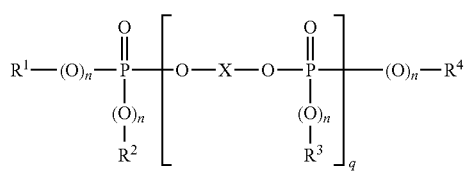

in which
R1, R2, R3 and R4, mutually independently mean in each case optionally halogenated C1 to C8 alkyl; C5 to C6 cycloalkyl, C6 to C20 aryl or C7 to C12 aralkyl in each case optionally substituted by alkyl, preferably C1 to C4 alkyl and/or halogen, preferably chlorine or bromine,
n mutually independently means 0 or 1,
q means 0 to 30 and
X means a mono- or polynuclear aromatic residue with 6 to 30 C atoms, or a linear or branched aliphatic residue with 2 to 30 C atoms, which may be OH-substituted and contain up to eight ether bonds.

Preferably, R1, R2, R3 and R4 mutually independently denote C1 to C4 alkyl, phenyl, naphthyl or phenyl-C1-C4-alkyl. The aromatic groups R1, R2, R3 and R4 may in turn be substituted with halogen and/or alkyl groups, preferably chlorine, bromine and/or C1 to C4 alkyl. Particularly preferred aryl residues are cresyl, phenyl, xylenyl, propylphenyl or butylphenyl and the corresponding brominated and chlorinated derivatives thereof.

X in the formula (V) preferably means a mono- or polynuclear aromatic residue with 6 to 30 C atoms. The latter is preferably derived from diphenols of formula (I).

n in the formula (V) may mutually independently be 0 or 1, preferably n is equal to 1.

q denotes integral values from 0 to 30, preferably 0 to 20, particularly preferably 0 to 10, in the case of mixtures it denotes average values of from 0.8 to 5.0, preferably of 1.0 to 3.0, more preferably of 1.05 to 2.00, and particularly preferably of from 1.08 to 1.60.

X particularly preferably denotes

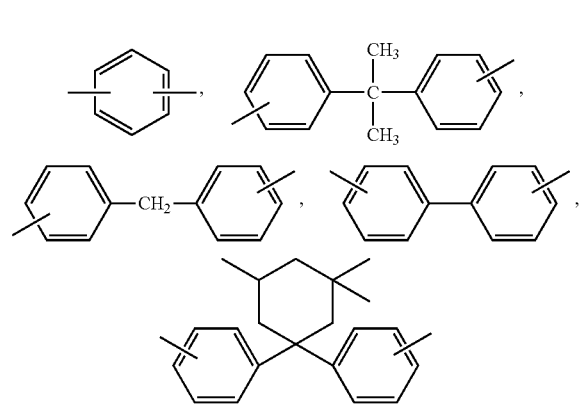

or the chlorinated or brominated derivatives thereof, in particular X is derived from resorcinol, hydroquinone, bisphenol A or diphenylphenol. Particularly preferably, X is derived from bisphenol A. Phosphorus compounds of formula (V) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged oligophosphate and bisphenol A-bridged oligophosphate. The use of oligomeric phosphoric acid esters of formula (V), which are derived from bisphenol A, is especially preferred.

Component D is very highly preferably a bisphenol A-based oligophosphate according to formula (Va)

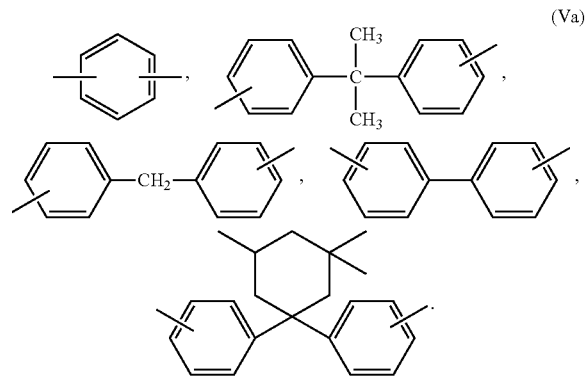

In an alternative preferred embodiment, component D is a resorcinol-based oligophosphate according to formula (Vb)

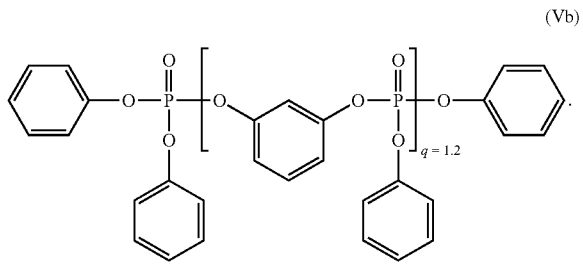

(Vb)

Component D phosphorus compounds are known (cf. for example EP-A 0 363 608, EP-A 0 640 655) or may be produced analogously in accordance with known methods (for example Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

Mixtures of phosphates with a different chemical structure and/or with identical chemical structures and different molecular weights may also be used as component D according to the invention.

Mixtures with an identical structure and a different chain length are preferably used, wherein the stated q value is the average q value. The average q value may be determined in that the composition of the phosphorus compound (molecular weight distribution) is determined by means of suitable methods (gas chromatography (GC), high pressure liquid chromatography (HPLC), gel permeation chromatography (GPC)) and the average values for q are calculated therefrom. In addition, phosphonate amines and phosphazenes, as described in WO 00/00541 and WO 01/18105, may be used as flame retardants.

The flame retardants may be used alone or in any desired mixture or in a mixture with other flame retardants.

Further preferred flame retardants for the purposes of the invention are salts of a phosphinic acid with any desired metal cations. Mixtures of salts which differ with regard to their metal cation may also be used. The metal cations are cations of metals from main group 1 (alkali metals, preferably $Li^+$, $Na^+$, $K^+$), from main group 2 (alkaline earth metals; preferably $Mg^{2+}$, $Ca^{2+}$, $Sr^{2+}$, $Ba^{2+}$, particularly preferably $Ca^{2+}$) or from main group 3 (elements of the boron group; preferably $Al^{3+}$) and/or from subgroups 2, 7 or 8 (preferably $Zn^{2+}$, $Mn^{2+}$, $Fe^{2+}$, $Fe^{3+}$) of the periodic table of elements.

A salt or a mixture of salts of a phosphinic acid of formula (IV) is preferably used,

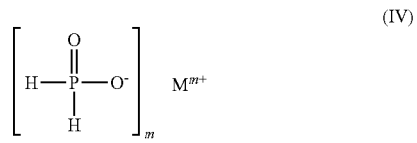

(IV)

in which $M^{m+}$ is a metal cation from main group 1 (alkali metals; m=1), main group 2 (alkaline earth metals; m=2) or from main group 3 (m=3) or from subgroups 2, 7 or 8 (wherein m means an integer from 1 to 6, preferably 1 to 3 and particularly preferably 2 or 3) of the periodic table of elements.

Particularly preferably in formula (IV)
where m=1, the metal cations $M^+$ are $Li^+$, $Na^+$, $K^+$,
where m=2, the metal cations $M^{2+}$ are $Mg^{2+}$, $Ca^{2+}$, $Sr^{2+}$, $Ba^{2+}$ and
where m=3, the metal cations $M^{3+}$ are $Al^{3+}$;
$Ca^{2+}$ (m=2) and $Al^{3+}$ (m=3) are very highly preferred.

In a preferred embodiment, the average particle size $d_{50}$ of the phosphinic acid salts (component D) is less than 80 μm, preferably less than 60 μm; $d_{50}$ is particularly preferably between 10 μm and 55 μm. The average particle size $d_{50}$ is the diameter above and below which are located in each case 50 wt. % of the particles. Mixtures of salts which differ with regard to their average particle size $d_{50}$ may also be used.

These above advantageous ranges for particle size are in each case associated with the technical effect that the flame retardant effectiveness of the phosphinic acid salts is increased.

The phosphinic acid salts may be used either alone or in combination with other phosphorus-containing flame retardants.

If the compositions according to the invention are rendered flame-retardant, an antidripping agent, preferably polytetrafluoroethylene (PTFE), is preferably additionally present. The proportion of PTFE in the total composition preferably amounts to from 0.05 parts by weight to 1.50 parts by weight, more preferably to from 0.1 parts by weight to 1.0 part by weight, and particularly preferably from 0.2 parts by weight to 0.6 parts by weight.

Component E

Component E comprises one or more thermoplastic vinyl (co)polymers E.1.

Suitable vinyl (co)polymers E.1 are polymers of at least one monomer from the group comprising vinyl aromatics, vinyl cyanides (unsaturated nitriles), (meth)acrylic acid ($C_1$-$C_8$) alkyl esters, unsaturated carboxylic acids and derivatives (such as anhydrides and imides) of unsaturated carboxylic acids. Particularly suitable are (co)polymers prepared from E.1.1 50 to 99, preferably 60 to 80 parts by weight of vinyl aromatics and/or ring-substituted vinyl aromatics (such as for example styrene, α-methylstyrene, p-methylstyrene, p-chlorostyrene) and/or methacrylic acid ($C_1$ to $C_8$) alkyl esters (such as methyl methacrylate, ethyl methacrylate), and E.1.2 1 to 50, preferably 20 to 40 parts by weight of vinyl cyanides (unsaturated nitriles) such as acrylonitrile and methacrylonitrile and/or (meth)acrylic acid ($C_1$-$C_8$) alkyl esters, such as methyl methacrylate, n-butyl acrylate, tert.-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers E.1 are resinous, thermoplastic and rubber-free. The copolymer prepared from E.1.1 styrene and D.1.2 acrylonitrile is particularly preferred.

The (co)polymers according to E.1 are known and may be produced by free-radical polymerisation, in particular by emulsion, suspension, solution or bulk polymerisation. The (co)polymers preferably have average molecular weights Mw (weight-average, determined by light scattering or sedimentation) of between 15,000 and 200,000.

Component F

The composition may contain one or more further conventional commercial additives according to component F), such as flame retardant synergists, antidripping agents (for example compounds of the substance classes of fluorinated polyolefins, silicones and aramid fibres), slip and mould release agents (for example pentaerythritol tetrastearate), nucleating agents, stabilisers, antistatic agents (for example conductive carbon blacks, carbon fibres, carbon nanotubes together with organic antistatic agents such as polyalkylene ethers, alkyl sulfonates or polyamide-containing polymers), acids, fillers and reinforcing materials (for example glass or carbon fibres, mica, kaolin, talcum, $CaCO_3$ and glass flakes) together with dyes and pigments, with the exception of conductive carbon blacks, carbon fibres, carbon nanotubes. The fluorinated polyolefins are preferably used in the form of a coagulated mixture of emulsions of fluorinated polyolefins with emulsions of a vinyl (co)polymer E.1, particularly preferably with emulsions of a copolymer based on styrene-acrylonitrile.

Transesterification stabilisers are preferably added to the composition. Phosphite-based stabilisers are in particular used for this purpose, wherein oligomeric phosphites are further preferred. Phosphite stabilisers, as described in WO 2004/007607, are particularly preferred.

Production of the Moulding Compounds and Mouldings

The thermoplastic moulding compounds according to the invention can suitably be produced by mixing the respective constituents in known manner and melt-compounding and melt-extruding them at temperatures of 240° C. to 300° C. in conventional units such as internal mixers, extruders and twin screw extruders.

Mixing of the individual constituents may proceed in known manner either successively or simultaneously, and indeed either at around 20° C. (room temperature) or at a higher temperature.

The present invention likewise provides a method for producing the moulding compounds and the use of the moulding compounds for producing mouldings as well as the mouldings themselves.

The moulding compounds according to the invention may be used to produce mouldings of all kinds. The latter may be produced by injection moulding, extrusion and blow moulding methods. Another type of processing is the production of mouldings by thermoforming from previously produced sheets or films.

Examples of such mouldings are films, profiles, housing parts of all kinds, for example for domestic appliances such as televisions, juice extractors, coffee machines, mixers; for office machines such as monitors, flat screens, notebook computers, printers, copiers; sheets, tubes, electrical installation ducting, windows, doors and further profiles for the construction sector (interior fittings and outdoor applications) together with electrical and electronic parts such as switches, plugs and sockets together with bodywork and interior components for commercial vehicles, in particular for the automotive sector.

In particular, the moulding compounds according to the invention may for example also be used for producing the following mouldings or moulded parts: interior fittings for rail vehicles, ships, aircraft, buses and other motor vehicles, casings for electrical appliances containing miniature transformers, casings for information processing and transmission equipment, casings and trim for medical equipment, massagers and casings therefor, toy vehicles for children, large-area wall elements, casings for safety apparatus and for televisions, thermally insulated transport containers, mouldings for sanitary and bathroom fittings, cover gratings for fan openings and casings for garden appliances.

The following Examples serve to illustrate the invention further.

EXAMPLES

Component A

Linear polycarbonate based on bisphenol A with a relative solution viscosity of $\eta_{rel.}=1.306\pm0.05$ measured in $CH_2Cl_2$ as solvent at 25° C. and a concentration of 0.5 g/100 ml, which corresponds to a weight-average molecular weight ($M_w$) of approx. 30,000 (measured by gel permeation chromatography with polycarbonate standard in DCM).

Component B1

Linear polyethylene terephthalate with an intrinsic viscosity of 0.95 measured in phenol/o-dichlorobenzene (1:1 parts by weight) at 25° C. and a content of isophthalic acid building blocks of 2 wt. %.

Component B2

Linear polyethylene terephthalate with an intrinsic viscosity of 0.95 measured in phenol/o-dichlorobenzene (1:1 parts by weight) at 25° C. and a content of isophthalic acid building blocks of 0%.

Component C

ABS polymer produced by emulsion polymerisation of 43 wt. % (relative to the ABS polymer) of a mixture of 27 wt. % acrylonitrile and 73 wt. % styrene in the presence of 57 wt. % (relative to the ABS polymer) of a particulate crosslinked polybutadiene rubber (average particle diameter $d_{50}$=0.35 μm).

Component D

Bisphenol A-based oligophosphate

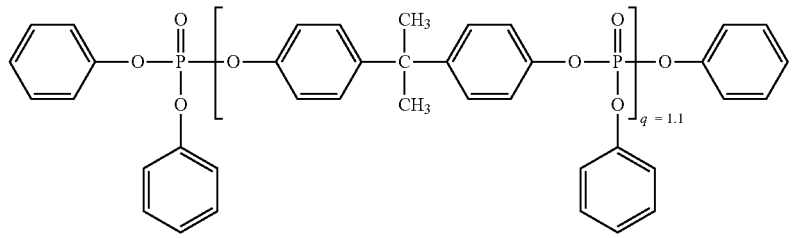

Component F1

Irganox® B900:
Mixture of 80 wt. % Irgafos® 168 (tris-(2,4-di-tert.-butyl)phenyl phosphite) and 20 wt. % Irganox® 1076 (octadecyl 3-(3,5-di-tert.-butyl-4-hydroxyphenyl)propionate) (BASF, Germany)

Component F2

Oligomeric phosphite stabiliser with the structural unit

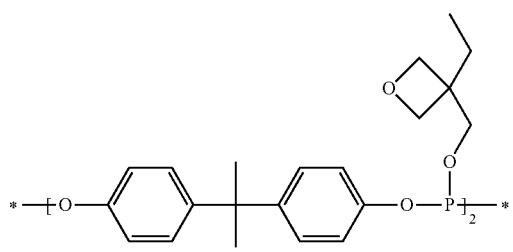

and a weight-average Mw of 1150 g/mol in polybutylene terephthalate (15 wt. % stabiliser).

Component F3

Mould release agent, pentaerythritol tetrastearate

Component F4

Polytetrafluoroethylene powder, CFP 6000 N, from Du Pont.

Production and Testing of Moulding Compounds

The ingredients listed in Table 1 are compounded and granulated at a machine temperature of 240° C. on a twin-screw extruder (ZSK-25) (from Werner & Pfleiderer) at a rotational speed of 225 rpm and a throughput of 15 kg/h.

The finished granules are converted into the appropriate test specimens in an injection moulding machine (melt temperature 270° C., mould temperature 70° C., melt-front speed 40 mm/s)

Elongation at break is measured at an elongation rate of 50 mm/s in a tensile test to ISO 527-1,-2.

Moulding shrinkage is determined on the basis of ISO 2577 on sheets of dimensions 150×105×3 mm.

Behaviour in the multiaxial penetration test is used as a measure of low temperature ductility in impact/crash testing of relevance to real world conditions. Penetration testing is carried out on the basis of ISO 6603-2 at a temperature of −30° C. on test specimens of dimensions 60 mm×60 mm×2 mm. This involves determining maximum energy absorption on the one hand, while, on the other hand, the fracture patterns of ten test specimens are evaluated as to what proportion suffered brittle, i.e. shattering failure.

Flammability is measured to UL 94V on bars of dimensions 127×12.7×1.5 mm.

TABLE 1

Compositions and their properties

|  | Ex. 1 | Comp. 1 | Ex. 2 | Comp. 2 | Ex. 3 | Comp. 3 |
|---|---|---|---|---|---|---|
| A | 47.8 | 47.8 | 62.8 | 62.8 | 71.2 | 71.2 |
| B1 | 30 |  | 15 |  | 20 |  |
| B2 |  | 30 |  | 15 |  | 20 |
| C | 7 | 7 | 7 | 7 | 7 | 7 |
| D | 13 | 13 | 13 | 13 |  |  |
| F1 | 0.1 | 0.1 | 0.1 | 0.1 | 0.1 | 0.1 |
| F2 | 1.3 | 1.3 | 1.3 | 1.3 | 1.3 | 1.3 |
| F3 | 0.4 | 0.4 | 0.4 | 0.4 |  |  |
| F4 | 0.4 | 0.4 | 0.4 | 0.4 | 0.4 | 0.4 |
| Elongation at break [%] | 66 | 51 | 57 | 42 | 124 | 122 |
| Transverse moulding shrinkage [%] | 0.48 | 0.53 | 0.49 | 0.49 | 0.62 | 0.64 |
| Energy absorption on sheet penetration (−30° C.) [J] | 48 | 43 | 45 | 41 | 57 | 58 |
| Proportion of penetration sheets with brittle fracture behavior (−30° C.) [%] | 10 | 100 | 10 | 90 | 0 | 0 |
| Total burning time, UL 94V (1.5 mm) [s] | 22 | 32 | 22 | 21 | n.m.* | n.m.* |
| UL 94V (1.5 mm) [class] | V0 | V2 | V0 | V0 | n.m.* | n.m.* |

*not measured

It is apparent from Table 1 that compositions according to the invention in Examples 1-3 with a combination of polycarbonate, polyalkylene terephthalates with isophthalic acid building blocks, impact modifier and optionally flame retardants are capable of achieving one object of the invention, i.e. they provide a combination of elevated elongation at break, low moulding shrinkage, good multiaxial toughness and optionally good performance in the UL 94V test.

The invention claimed is:

1. A composition comprising
   A) 41 to 80 parts by weight, in each case relative to the sum of the parts by weight of components A+B+C+D, of aromatic polycarbonate,
   B) 5 to 40 parts by weight, in each case relative to the sum of the parts by weight of components A+B+C+D, of polyester comprising ethylene glycol and a mixture of terephthalic acid building blocks and isophthalic acid building blocks, with a content of at least 2.0 wt. % and at most 4.0 wt. % of isophthalic acid building blocks, relative to component B,
   C) 1 to 15 parts by weight, in each case relative to the sum of the parts by weight of components A+B+C+D, of rubber-modified graft polymer,
   D) 0 to 25 parts by weight, in each case relative to the sum of the parts by weight of components A+B+C+D, of a flame retardant,
   E) 0 to 20 parts by weight, in each case relative to the sum of the parts by weight of components A+B+C+D=100, of vinyl (co)polymer,
   F) 0 to 50 parts by weight, in each case relative to the sum of the parts by weight of components A+B+C+D=100, of one or more additives,
   wherein all the stated parts by weight are normalised such that the sum of the parts by weight of components A+B+C+D in the composition amounts to 100.

2. A composition according to claim 1, comprising 21 to 30 parts by weight, in each case relative to the sum of the parts by weight of components A+B+C+D, of polyester according to component B).

3. A composition according to claim 1, wherein component B) comprises a recycled material.

4. A composition according to claim 1, wherein the flame retardant of component D) is present and comprises a phosphorus-containing flame retardant selected from the group consisting of mono- and oligomeric phosphoric and phosphonic acid esters, phosphonate amines, phosphazenes and phosphinic acid salts.

5. A composition according to claim 1, wherein the flame retardant is present and comprises an oligophosphate.

6. A composition according to claim 1, wherein the flame retardant is present and is a salt or a mixture of salts of a phosphinic acid, wherein the metal cation is $Li^+$, $Na^+$, $K^+$, $Mg^{2+}$, $Ca^{2+}$, $Sr^{2+}$, $Ba^{2+}$, $Al^{3+}$, $Zn^{2+}$, $Mn^{2+}$, $Fe^{2+}$ and/or $Fe^{3+}$.

7. A composition according to claim 4, wherein said phosphorus-containing flame retardant comprises a salt or a mixture of salts of a phosphinic acid of formula (IV),

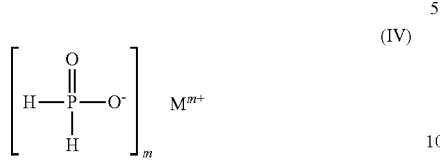

(IV)

in which
$M^{m+}$ is a metal cation main group 1 (alkali metals; m=1), main group 2 (alkaline earth metals; m=2) or of main group 3 (m=3) or of subgroups 2, 7 or 8 (wherein m means an integer from 1 to 6) of the periodic table of elements.

8. A composition according to claim 1, wherein the one or more additives according to component F) is present and comprise one or more flame retardant synergists, antidripping agents, slip and mould release agents, nucleating agents, stabilisers, antistatic agents, acids, fillers and reinforcing materials together with dyes and pigments.

9. A composition according to claim 1 that is suitable for producing a moulding.

10. A moulding comprising a composition according to claim 1.

11. A composition comprising
A) 41 to 80 parts by weight, in each case relative to the sum of the parts by weight of components A+B+C+D, of aromatic polycarbonate,
B) 10 to 35 parts by weight, in each case relative to the sum of the parts by weight of components A+B+C+D, of polyester comprising ethylene glycol and a mixture of terephthalic acid building blocks and isophthalic acid building blocks, with a content of at least 2.0 wt. % and at most 4.0 wt. % of isophthalic acid building blocks, relative to component B,
C) 2 to 11 parts by weight, in each case relative to the sum of the parts by weight of components A+B+C+D, of rubber-modified graft polymer,
D) 5 to 18 parts by weight, in each case relative to the sum of the parts by weight of components A+B+C+D, of a flame retardant,
E) 0 to 20 parts by weight, in each case relative to the sum of the parts by weight of components A+B+C+D=100, of vinyl (co)polymer,
F) 0.5 to 25.0 parts by weight, in each case relative to the sum of the parts by weight of components A+B+C+D=100, of one or more additives,
wherein all the stated parts by weight are normalised such that the sum of the parts by weight of components A+B+C+D in the composition amounts to 100.

12. A composition consisting of
A) 41 to 80 parts by weight, in each case relative to the sum of the parts by weight of components A+B+C+D, of aromatic polycarbonate,
B) 5 to 40 parts by weight, in each case relative to the sum of the parts by weight of components A+B+C+D, of polyester comprising ethylene glycol and a mixture of terephthalic acid building blocks and isophthalic acid building blocks, with a content of at least 2.0 wt. % and at most 4.0 wt. % of isophthalic acid building blocks, relative to component B,
C) 1 to 15 parts by weight, in each case relative to the sum of the parts by weight of components A+B+C+D, of rubber-modified graft polymer,
D) 0 to 25 parts by weight, in each case relative to the sum of the parts by weight of components A+B+C+D, of a flame retardant,
E) 0 to 20 parts by weight, in each case relative to the sum of the parts by weight of components A+B+C+D=100, of vinyl (co)polymer,
F) 0 to 50 parts by weight, in each case relative to the sum of the parts by weight of components A+B+C+D=100, of one or more additives,
wherein all the stated parts by weight are normalised such that the sum of the parts by weight of components A+B+C+D in the composition amounts to 100.

13. A composition according to claim 11, wherein the one or more additives according to component F) are included in said composition and comprise one or more flame retardant synergists, antidripping agents, slip and mould release agents, nucleating agents, stabilisers, antistatic agents, acids, fillers and reinforcing materials together with dyes and pigments.

14. A moulding comprising a composition according to claim 11.

15. A moulding comprising a composition according to claim 12.

16. A composition according to claim 12, wherein the one or more additives according to component F) are included in said composition and comprise one or more flame retardant synergists, antidripping agents, slip and mould release agents, nucleating agents, stabilisers, antistatic agents, acids, fillers and reinforcing materials together with dyes and pigments.

17. A composition according to claim 1, wherein the proportion of penetration sheets with brittle fracture behaviour at −30° C. is less than 30%.

18. A composition according to claim 11, wherein the proportion of penetration sheets with brittle fracture behaviour at −30° C. is less than 30%.

19. A composition according to claim 12, wherein the proportion of penetration sheets with brittle fracture behaviour at −30° C. is less than 30%.

20. A composition according to claim 1, comprising
A) 45 to 73 parts by weight, in each case relative to the sum of the parts by weight of components A+B+C+D, of aromatic polycarbonate,
B) 15 to 30 parts by weight, in each case relative to the sum of the parts by weight of components A+B+C+D, of polyester comprising ethylene glycol and a mixture of terephthalic acid building blocks and isophthalic acid building blocks, with a content of at least 2.0 wt. % and at most 4.0 wt. % of isophthalic acid building blocks, relative to component B,
C) 4 to 9 parts by weight, in each case relative to the sum of the parts by weight of components A+B+C+D, of rubber-modified graft polymer,
D) 7 to 14 parts by weight, in each case relative to the sum of the parts by weight of components A+B+C+D, of a flame retardant,
E) 0 to 15 parts by weight, in each case relative to the sum of the parts by weight of components A+B+C+D=100, of vinyl (co)polymer,
F) 1.0 to 4.0 parts by weight, in each case relative to the sum of the parts by weight of components A+B+C+D=100, of one or more additives,
wherein all the stated parts by weight are normalised such that the sum of the parts by weight of components A+B+C+D in the composition amounts to 100.

* * * * *